Patented Jan. 1, 1946

2,391,943

UNITED STATES PATENT OFFICE 2,391,943

NONBENZENOID COMPOUNDS

Lewis W. Butz, Beltsville, Md., assignor to Claude R. Wickard, as Secretary of Agriculture of the United States of America, and his successors in office No Drawing. Original application December 12, 1942, Serial No. 468,795. Divided and this application July 10, 1945, Serial No. 604,290

1 Claim. (Cl. 260—468)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This application is a division of my copending application for Patent Serial No. 468,795, filed December 12, 1942.

My invention relates to non-benzenoid fused polycyclic organic compounds and to processes for preparing them.

I have found that organic compounds belonging to the class of 1,5-diene-3-ynes, i. e., compounds containing the atomic grouping

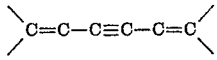

react with two moles of dienophilic compounds containing the atomic grouping

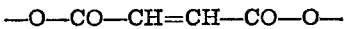

such as, maleic anhydride, methyl fumarate, ethyl fumarate, and other maleates and fumarates including substituted compounds, to form stable addition products which contain two carbon rings more than are contained in the dieneyne employed. The reaction is carried out in the absence of any solvent and at a temperature of 130° C. to 175° C. The molecular weight of these products is equal to the sum of the molecular weight of the dieneyne employed and twice the molecular weight of the dienophilic compound used.

Thus the dieneyne, cyclohexenylcyclopentenylacetylene

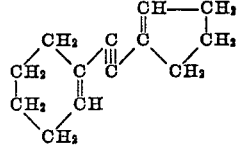

reacts readily with maleic anhydride. By this reaction, there is formed a compound containing four rings of carbon atoms having substantially the structure:

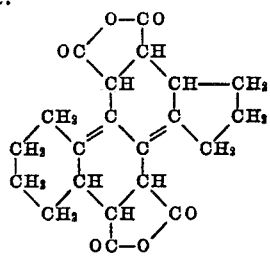

This is a non-benzenoid steroid. It possesses the seventeen-carbon four-ring skeleton common to all the steroids which have been found in organic materials. Furthermore, it is a steroid containing only hydrogenated rings and one novel feature of the process is its capacity to yield polycyclic compounds lacking any aromatic (benzenoid) ring.

All known processes for the synthesis of steroids relate to the preparation of benzenoid steroids. But the majority of the naturally occurring steroids, among them the therapeutically important male hormones, adrenocortical hormones, and progesterone are non-benzenoid.

My process makes available, for the first time, by synthesis, steroids of the non-benzenoid type, as well as non-steroid types of polycyclic compounds, which are useful as intermediates in the synthesis of therapeutic compounds.

The following example for the preparation of trans - 6,7 - trans - 11,12 - tetracarbomethoxy-8(14),9-chrysitadiene will illustrate my invention more fully.

One molecular proportion of dicyclohexenylacetylene and two molecular proportions of methyl fumarate were heated under nitrogen in a sealed tube at 175° C. for 24 hours, and then subjected to vacuum distillation, which resulted in a viscous, amber residue. This residue was crystallized from methanol, yielding the product:

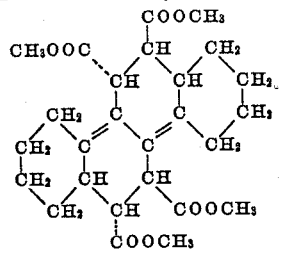

The product has a melting point of 111.6°–112.6° C. and an empiric composition of $C_{26}H_{34}O_8$. Absorption spectrum data indicates the presence of two conjugated double bonds as shown.

Having thus described my invention, I claim:

The trans-6,7-trans-11,12-tetracarbomethoxy-8(14),9-chrysitadiene, having substantially the structure:

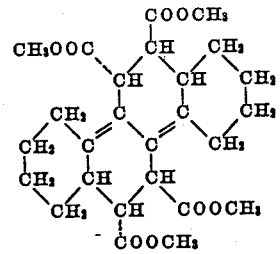

LEWIS W. BUTZ.